(12) United States Patent
Richmond (10) Patent No.: US 6,429,800 B1
(45) Date of Patent: Aug. 6, 2002

(54) EXPENDABLE JAMMER

(75) Inventor: Martin R. Richmond, Lexington, MA (US)

(73) Assignee: BAE Systems Information and Electronic Systems Integration, Inc., Nashua, NH (US)

(*) Notice: Subject to any disclaimer, the term of this patent is extended or adjusted under 35 U.S.C. 154(b) by 0 days.

(21) Appl. No.: 05/609,452

(22) Filed: Aug. 26, 1975

(51) Int. Cl.⁷ .................................................. G01S 7/38
(52) U.S. Cl. ........................................... 342/14; 342/15
(58) Field of Search ............................... 342/13, 14, 15, 342/5, 6, 9, 12, 175

(56) References Cited

U.S. PATENT DOCUMENTS

| | | | |
|---|---|---|---|
| 3,618,096 A | * 11/1971 | Schoneborn | 342/14 |
| 3,710,256 A | * 1/1973 | Lewis | 455/1 |
| 3,841,219 A | * 10/1974 | Schillreff | 102/342 |
| 3,896,441 A | * 7/1975 | Richmond | 342/15 |
| 4,307,400 A | * 12/1981 | Miley | 342/14 |
| 5,532,696 A | * 7/1996 | Cyrulik et al. | 342/14 |
| 5,623,266 A | * 4/1997 | Grigsby | 342/14 |

* cited by examiner

Primary Examiner—John B. Sotomayor
(74) Attorney, Agent, or Firm—Daniel J. Long; Robert K. Tendler (57) ABSTRACT

An expendable jammer is ejected as a decoy from a target in which the jammer includes a single port, keyed primed oscillator which is primed with the low level signal received at its antenna. The priming signal is injected directly into the tank circuit of the oscillator which is rapidly turned on and off (keyed) to produce a rapidly pulsed signal which tracks the frequency of the priming signal. The resultant signal from the oscillator is transmitted back to the receiving section of the radar initiating the signal in such a manner that the receiver cannot distinguish the individual pulses of returned energy due to the high PRF of the returned signal. Thus the signal from the jammer is detected as a CW signal. The expendable jammer also has a multiple threat capability in which simultaneously arriving signals from different sources result in a jammer output at each of the different frequencies of the incoming signals with sufficient jamming power at each frequency.

10 Claims, 8 Drawing Sheets

SIMULTANEOUS SIGNALS - EQUAL AMPLITUDE

A  $f_1$

B  $f_2$

C  
fav

D  
INPUT MIXING

E  
TRANSMITTED SIGNAL

FIG. 4

SIMULTANEOUS SIGNALS-UNEQUAL AMPLITUDE

A   $f_1$

B   $f_2$

C   $f_1$ + PHASE SHIFTS

D 
$f_1$   $f_2$   f →
INPUT MIXING

E 
6db DOWN
$f_1$   $f_2$   f →
TRANSMITTED SIGNAL

EXPENDABLE JAMMER

SCOPE OF THE INVENTION

This invention relates to radar jamming systems and more particularly to the use of a primed oscillator in combination with an antenna and a keying circuit as an expendable decoy ejected from a target which produces suitable jamming signals as the decoy moves away from the target.

BACKGROUND OF THE INVENTION

One of the frequently occurring situations necessitating radar jamming is a situation involving an incoming missile which homes on a "target" via a CW radar signal. This signal, when returned from a "target", is analyzed as to doppler frequency shift which provides the relative velocity of the "target" with respect to the missile, and as to modulation which provides the angular bearing of the "target". In the past, jammers for this tactical situation have involved the generation of a CW signal by the target in which the frequency of the signal is made to vary in a predetermined fashion to convey false doppler frequency shift information. This is commonly called "stealing the speed gate" of the "enemy" radar. Additionally, the jamming signal is modulated to convey false angular bearing information. In the prior art jamming devices, it is usually necessary to detect the frequency of the incoming radar signal and to synthetically produce a signal having this frequency. Having generated this signal, the frequency of this signal is slowly varied for the required doppler shift and is modulated to give the false bearing information.

By way of background, there have been basically three approaches to generating the above described CW jamming. The first is a CW amplification approach in which the incoming signal is amplified by a chain of amplifiers and reradiated. In this approach, the false doppler and bearing modulations are applied during amplification and two antennas are required. This approach suffers from two disadvantages. 1) A very high antenna isolation is required to prevent a ring-around type feedback between the antennas. On many installations sufficient isolation is physically impossible to achieve. 2) A separate CW power amplifier tube is required, in addition to the pulse tube which is normally carried for pulse jamming.

The second approach eliminates the antenna isolation problem by using an oscillator to generate the jamming signal. The oscillator is set on frequency by a receiver which briefly samples the received radar signal at periodic intervals. Thus it will be appreciated that the jamming must be interrupted during these "look-thru's", so that received radar signals may be sampled. This approach suffers from the disadvantage that the receiver for the jammer is either complex or has a slow response. In addition, a separate CW power tube is still needed.

The third approach makes use of the pulsed power amplifier and simulates CW by a train of pulse bursts. The switching-off between pulses solves the aforementioned ring-around problem, and the time between bursts is available for pulse jamming other threats. However, this approach suffers a severe power/efficiency limitation because the effective power is reduced from the average power by the duty factor. By way of example, typical pulse tubes are limited to a duty factor of about 10%; therefore the effective power is only about 1% of the peak power. It will be appreciated that all of these jammers are carried "on board" the "target".

Instead of "on-board" apparatus, doppler jamming may be accomplished by, for instance, the ejecting of a repeater or transponder at an angle from an aircraft. It is the function of the repeater or transponder to duplicate the incoming signal, with false doppler information being introduced by the different velocity of the ejected decoy with respect to the "enemy" radar, and with the false bearing information being automatically provided by virtue of the angular difference between the ejected decoy and the true "target".

In the subject invention, an expendable jammer is ejected as a decoy from a target for countermeasuring CW signals from "enemy" radars, in which the jammer includes a single port, keyed, high power oscillator which is primed with the low level signal received from the "enemy" radar. The priming signal is injected directly into the tank circuit of the oscillator which is rapidly turned on and off (keyed) to produce a rapidly pulsed signal which tracks the frequency of the incoming signal. The keying is accomplished either by removing the power from the oscillator, by shorting the tank circuit, or by gating the negative resistance element in the oscillator.

It is important to the understanding of the subject system to distinguish the subject priming system from traditional injection locking systems. In injection locking the injected signal is a relatively high level signal strong enough to lock the oscillator frequency to the injected frequency. The signal from the "enemy" radar normally does not reach injection locking levels at the "target" and thus injection of a received signal into a remote oscillator circuit will not lock the remote oscillator to the frequency of the received signals. In priming, the injected signal need only be strong enough to force the oscillator to start up in phase with the priming signal at the start of each pulse. In priming there is no locking or changing of the oscillator. Rather the oscillator is allowed to run at its natural frequency and is rapidly keyed so that the oscillator is turned off before its signal can accumulate a significant phase error with respect to the incoming signal. The result is that the output signal from the oscillator tracks the frequency of the priming signal to the extent that the phase difference between the priming signal and the natural frequency signal from the oscillator is small. Since this phase difference can be made very small by rapid keying, the frequency of the output signal from the keyed primed oscillator approximates or tracks that of the priming signal.

The resultant signal from the oscillator is coupled back to the same antenna used for receiving the "enemy" radar signal and is transmitted back to the receiving section of the "enemy" radar which cannot distinguish the individual pulses of returned energy due to the high PRF (pulse repetition frequency) of the returned signal. Thus, the signal from the jammer is detected as a CW signal. By virtue of ejecting the jammer, the enemy radar is given false bearing and doppler information causing the enemy radar to either lose track or to home on the expendable jammer. The expendable jammer also has a multiple threat capability in which simultaneously arriving signals from different "enemy" radars result in a jammer output at each of the different frequencies of the incoming signals with sufficient jamming power at each frequency.

The primed oscillator is therefore a very simple broadband jammer which can follow the incoming frequency by virtue of the rapid keying or chopping. This rapid keying or chopping while permitting the oscillator to follow the frequency of the incoming signal also results in a pulsed signal with a sufficiently high PRF that the "enemy" radar receiver cannot resolve the pulses of the returned signal and thus "sees" only a CW signal. Due to the availability of IMPATT diode oscillators which have outputs exceeding 100 watts, amplification stages are unnecessary. Moreover since the duty cycle can be close to 100%, the effective power of the oscillator can be very high. Since the subject system utilizes only one antenna there is no isolation problem. It is also an important feature of the primed oscillator that it can be used in its chopped or keyed mode for handling simultaneous multiple incoming signals. This comes about as follows. When two or more CW signals are present, at different frequencies, their resultant is a single signal of varying phase and amplitude. Each time the oscillator is keyed on it is primed by that resultant. Its phase on successive pulses will therefore faithfully follow the phase of the resultant signal, thereby in effect reproducing all the incoming frequencies.

Thus the use of a primed oscillator introduces simplicity and low weight due to the lack of amplification stages necessary, and the power supply requirements are minimized due to the fact that the oscillator signal is utilized directly rather than being again amplified. When this jammer is ejected from a potential "target" no additional circuitry is required for false doppler information because the movement of the decoy away from the target provides false bearing information automatically, while the speed difference between the true "target" and the decoy relative to the incoming missile due to drag on the decoy provides false doppler information.

It is therefore an object of this invention to provide a system for jamming in which a primed oscillator is utilized in a rapidly keyed mode to generate a rapidly pulsed jamming signal having an apparent frequency which duplicates that of the incoming signal.

It is another object of this invention to provide a expendable jammer utilizing a rapidly keyed primed oscillator in which the jammer package is ejected from a "target" in such a manner that the apparent angular bearing and relative speed between the "enemy radar" and the "target" are effectively altered.

It is a still further object of this invention to provide a jamming system in which amplifiers or amplification stages are eliminated in favor of a high power primed oscillator which is rapidly keyed to provide an essentially continuous CW signal made up of numerous packets of signals, each of which is initially in phase with the incoming radar signal such that the output signal from the jamming system has a synthetically produced frequency approximating that of the priming signal.

It is another object of this invention to provide a jamming system utilizing a rapidly keyed primed oscillator having a multi-threat capability in which the simultaneous arrival of two or more different signals from different "enemy" radars results in the production of a signal having frequency components which duplicate those of the incoming signals.

DETAILED DESCRIPTION

When the keyed primed oscillator is utilized in the expendable jammer situation there need be no special modulation superimposed on the signal from the primed oscillator since false bearing and relative speed information will be imparted by merely ejecting the expendable jammer from the target. The false bearing angle information will obviously be the increasing angle between the actual "target" and the expendable jammer which serves as a decoy. Simultaneous with the conveyance of false bearing angle information, false doppler information will be imparted, since the relative velocity between the "enemy" radar and the expendable jammer will be different than that between the true "target" and the "enemy" radar due to drag on the decoy or due to ejection from the target at an angle other than perpendicular to the direction of travel of the target. It will be appreciated therefore that there need be only four elements to the expendable jammer: an antenna, a primed oscillator, some means of rapidly keying the oscillator, and a power supply. Since the expendable jammer need only operate for a limited time, as little as 10 seconds in a typical application, the power supply can be relatively small. Thus the entire unit may be packaged in a cigarette package sized container which is dropped from the "target" or ejected in any suitable manner. As will be appreciated, the expendable jammer may be ejected not only from aircraft but also from either surface vessels or land based equipment. The keying of the oscillator may take place either by shorting the tank circuit of the oscillator or by periodically interrupting the power supply to the active element of the oscillator. Additionally, if the oscillator is a transistor oscillator as opposed to a diode oscillator, the transistor may be gated on and off rapidly by appropriate bias control.

An explanation of the primed oscillator phenomenon is now presented as it relates to a typical CW jamming situation.

Figure 1A:
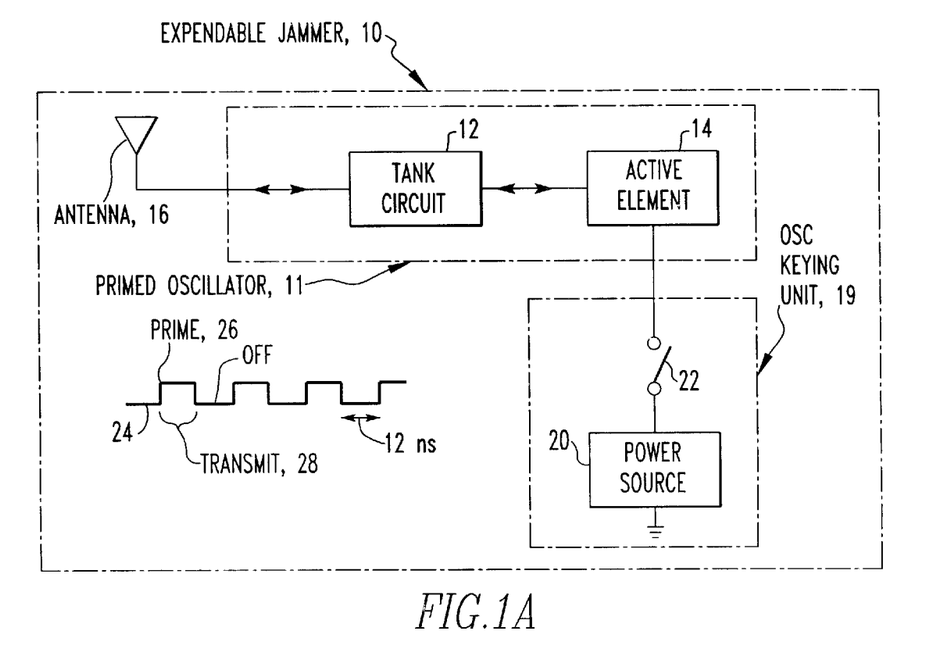
FIGS. 1A–1C are diagrams and diagramatic representations of the subject keyed, single-port primed oscillator in which an incoming signal is coupled into the tank circuit of the oscillator.
Figure 1B:
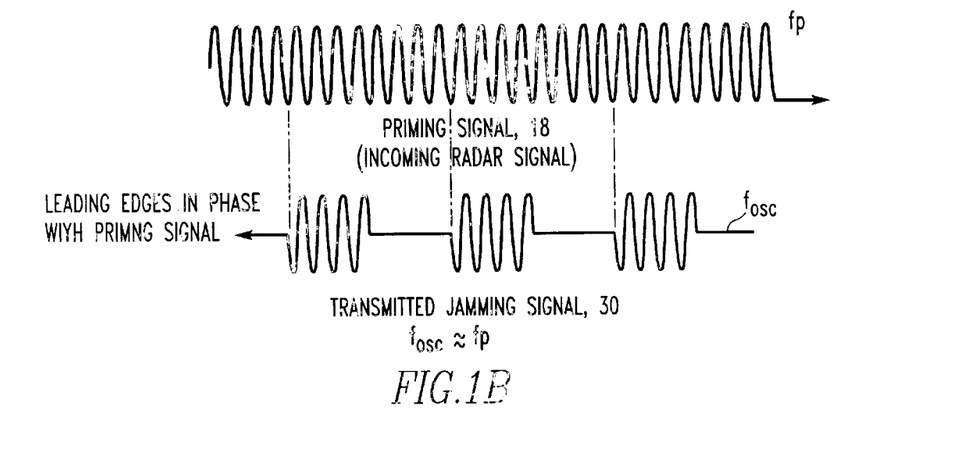

Referring now to FIG. 1A the subject jammer 10 includes a primed oscillator 11 which typically includes a tank circuit 12 and an active element 14 which may be any type of negative resistance element. In this embodiment, the oscillator is a one-port oscillator. An antenna 16 is directly coupled to the tank circuit via this port so that incoming signals 18 (FIG. 1B) may be coupled directly into the tank circuit and so that output signals may be coupled from this port directly bask to the antenna. For purposes of discussion the incoming signal will be assumed to be a CW signal having a frequency $f_p$. The incoming signal is utilized as a priming signal and need be only a few dB above the ambient noise level (i.e. many tens of dB below the oscillator output level). This distinguishes the subject system from injection locking systems in which the amplitude of the injected signal is only a few tens of dB below the output signal from the oscillator.

Figure 1C:
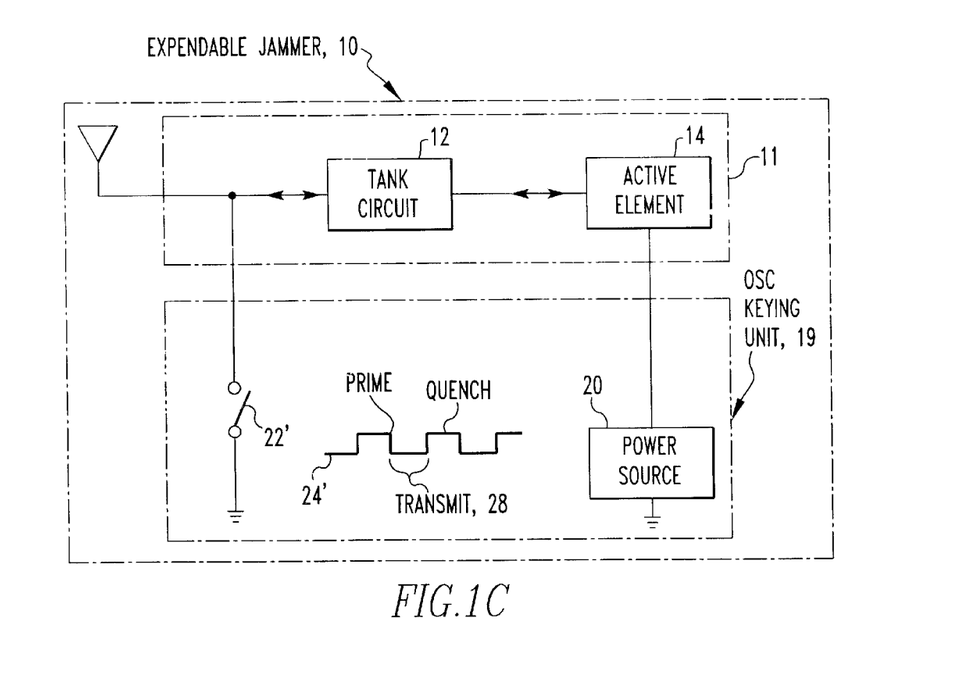

In the embodiment shown in FIG. 1A, the oscillator is turned on and off by an oscillator keying unit 19 which includes a power source 20 connected to active element 14 via a switch 22 provided to interrupt the power to the oscillator periodically. Alternatively, as illustrated in FIG. 1C, the keying unit may operate a switch 22' to periodically short the tank circuit. The shorting of the tank circuit is referred to herein as "quenching".

In FIG. 1A switch 22 is actuated in accordance with pulsed waveform 24 such that this switch is closed when the waveform is high and open when the waveform is low. In the FIG. 1A embodiment upon closing of switch 22, oscillator 11 is turned on and is primed at the instant of time that the switch contacts close. This is indicated by arrow 26. Thereafter the oscillator is allowed to run for approximately 12 nanoseconds thereby to transmit a signal from antenna 16 during the time interval illustrated at 28. At the end of this cycle switch 22 is opened and the oscillator is turned off. This produces a rapidly chopped signal 30 (FIG. 1B) made up of wave packets. As will be described, the pulse repetition frequency (PRF) of this signal is made high enough so that the primed oscillator effectively tracks the frequency of incoming signals. In this description it will be noted that the higher the keying rate, the better will be the simulated frequency following or tracking of the oscillator output signal. It is a property of the keyed primed oscillator that when the oscillator is turned on the oscillator signal is in phase with the incoming signal. Although the oscillator always oscillates at its natural frequency, because the phase difference between the oscillator signal and the priming signal starts out being 0°, if the oscillator is turned off before this phase difference can build up to 90°, the oscillator output signal will "simulate" the priming signal in frequency. For priming signal frequencies within a band of, for instance 20 MHz (of the oscillator's natural frequency; the phase difference will not build up to 90° for many hundreds of cycles. Thus the oscillator output can "track" the frequency of the incoming signal within limits set by the oscillator keying rate. This rate for effective frequency following is generally on the order of 10 MHz or greater for microwave frequencies, although frequency following has been noted at keying rates as low as 1 KHz.

By way of summary, it will be appreciated that the ON-time of the oscillator must be short enough to permit a maximum frequency difference between the priming signal frequency and the natural frequency of the oscillator. The shorter the ON-time the greater will be the frequency response of the jammer and the less excessive will be the phase error. Concomitantly the duty cycle of the oscillator must be kept high (50%–75%) to maintain efficiency, although speed and duty cycle will depend in the limit on oscillator rise and decay times. It will be appreciated that the resulting PRF's will always be much higher than the "enemy" receiver bandwidth, so there exist a large range of keying rates which can be chosen. Moreover there need be no necessary correlation between the chopping or keying rate and the frequency of the incoming priming signal. Thus, in the subject jamming system, the oscillator circuit can be tuned to a fixed frequency and yet respond properly to a wide range of frequencies. This differs from prior art jamming systems in which the oscillator must be tuned to accomodate the different frequencies of the incoming radar signals. While the duty cycle of the keying circuit is important with respect to the average output power from the jammer, as long as the keying is relatively rapid, the ability of the jammer to follow the frequency of the incoming signal will not be impaired by use of a wide range of duty cycles. In one operative embodiment of the subject invention duty cycles of 50–75% at a frequency of 14 MHz provided adequate frequency following over a frequency range of ±100 MHz and CW signal simulation.

The primed oscillator may take on the form of any oscillator whatsoever, which is rapidly turned off and turned on in a periodic fashion. In the microwave region of the electromagnetic spectrum transistor oscillators, GUNN diode oscillators and IMPATT diode oscillators have been found effective. Moreover, 100 watt IMPATT diode oscillators have been fabricated. While the subject system will be described in terms of IMPATT diode oscillators it will be understood that any keyed oscillator having a priming signal injected into its tank circuit is within the scope of this invention. Moreover, as illustrated by keying unit 19' in FIG. 1C, the keying unit can take on a number of different forms. In this embodiment power is continuously supplied to the oscillator by power source 20' and switch 22' is keyed in accordance with waveform 24' such that when switch 22' is closed the tank circuit is shorted and the oscillator is turned off.

Figure 2:
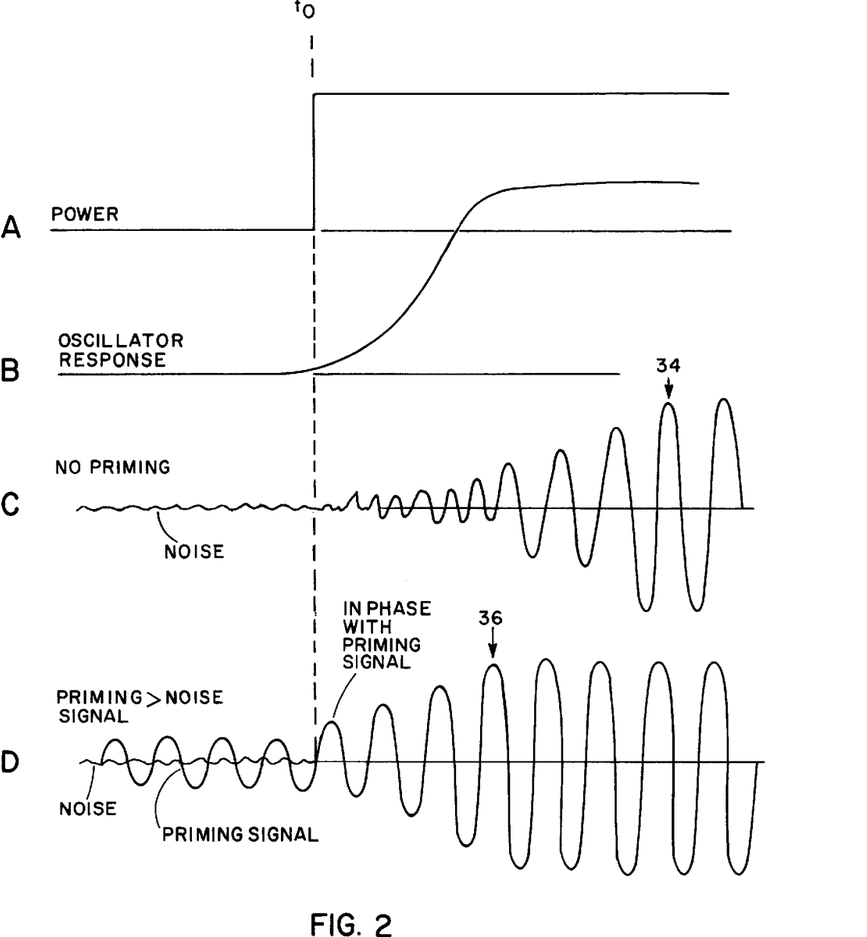
FIG. 2 is a waveform diagram illustrating the operation of the primed oscillator with and without priming signals.

Referring now to FIG. 2, the series of waveforms presented describe the operation of the primed oscillator during the instant of time in which the power is applied to the oscillator and immediately thereafter. Waveform A indicates a step function power characteristic in which power is instantaneously applied to time $t_0$. This is equivalent to unquenching the oscillator. Waveform B represents the amplitude of the oscillator signal responsive to the application of power. In accordance with waveform C when there is no priming signal, at time $t_0$ the oscillations of the oscillator will be in step with the phase of the noise signal then existing at the oscillator tank circuit. The oscillator signal gradually builds up until such time (as indicated by arrow 34) that its maximum amplitude is reached. At this time the oscillator will be oscillating at its natural frequency. In accordance with waveform D, however, the priming signal is greater than the ambient noise level. As can be seen from waveform D at time $t_0$ the oscillator signal is initially in phase with the priming signal and builds up in phase with the priming signal until. maximum amplitudes reached as indicated by arrow 36. It will be appreciated that when a priming signal is applied, the oscillator reaches maximum amplitude more quickly than in the unprimed case. When a priming signal is applied and the oscillator is turned ON, several cycles of the oscillator signal are in phase with the priming signal and this phase coherency gradually degrades as time goes on. The speed of the degradation depends on the frequency difference between the natural frequency of the oscillator and that of the priming signal. This phenomenon is illustrated in connection with FIG. 3.

Figure 3:
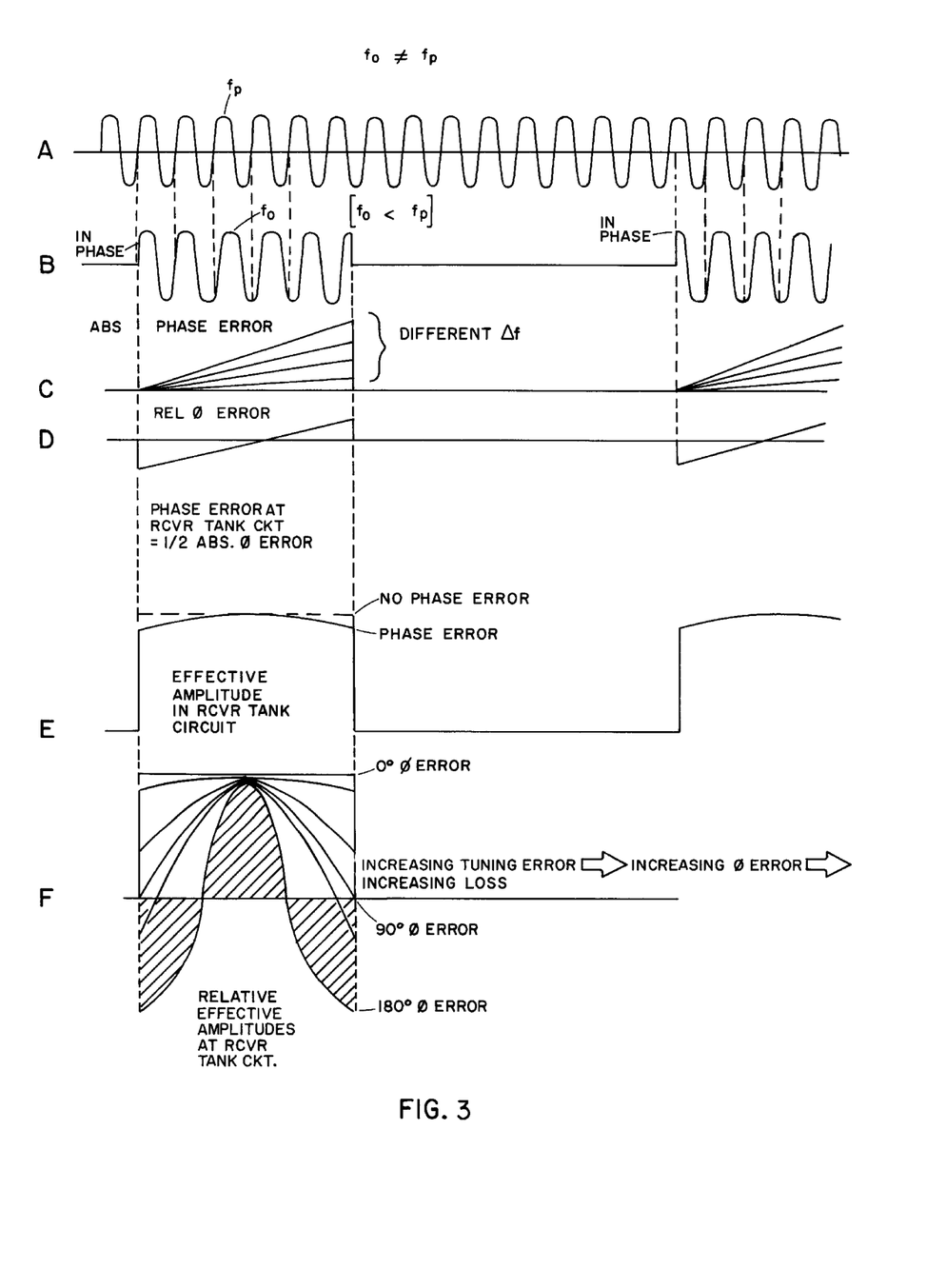
FIG. 3 is a waveform diagram illustrating the operation of the primed oscillator in the time domain with respect to the increasing phase error during the transmitted pulse and also the effective amplitude in the receiver of the "enemy" radar with respect to this phase error.

Turning now to FIG. 3, waveform A represents a priming signal having a frequency $f_p$, where $f_p$ is different from $f_o$, the natural frequency of the oscillator. The oscillator output signal is illustrated by waveform B. As can be seen, the cycles in waveform B start off in phase with those of the priming signal. As time increases, waveform B becomes increasingly more out of phase with waveform A and generates a phase error as illustrated at C. This phase error is generally linear, with different slopes indicating different $\Delta f$'s, the difference in frequency between the priming signal and the natural frequency of the oscillator. This phase error is absolute phase error. The relative phase error is given by waveforms illustrated at D such that a maximum absolute phase error of 90° is converted into a relative phase error of 45° at the receiver tank circuit. The effective amplitude in the receiver tank circuit is indicated at E. Increasing phase error results in a decrease in amplitude at the beginning and end of the pulsed signal. As illustrated at F, increasing tuning error results in increasing phase error which results in increasing loss such that with a 180° phase error there is signal cancellation. It is a finding of the subject invention that the subject system can operate effectively with up to 90° relative phase error.

In operation, the subject expendable jammer operates against a CW conical scan mode missile-carried radar. The jammer is capable of responding to a signal as low as 450 dbm and transmits a coherent signal of +19 dbm to yield a 0 db jam-to-signal ratio (J/S) at short range. For a constant output power jammer, this is equivalent to 69 db of gain. Since in one embodiment the "enemy" radar within the missile is known to have a 500 hz doppler filter it is also important that the transmit power be "on frequency". In one embodiment the range of the expendable jammer is between 2 and 20 miles.

It should be noted that the tank circuit of the receiver has a response time of about 2 milliseconds such that it cannot discriminate against pulse trains of greater than 1 KHz. Pulse trains of >1KHz PRF thus are detected as CW signals.

Figure 4:
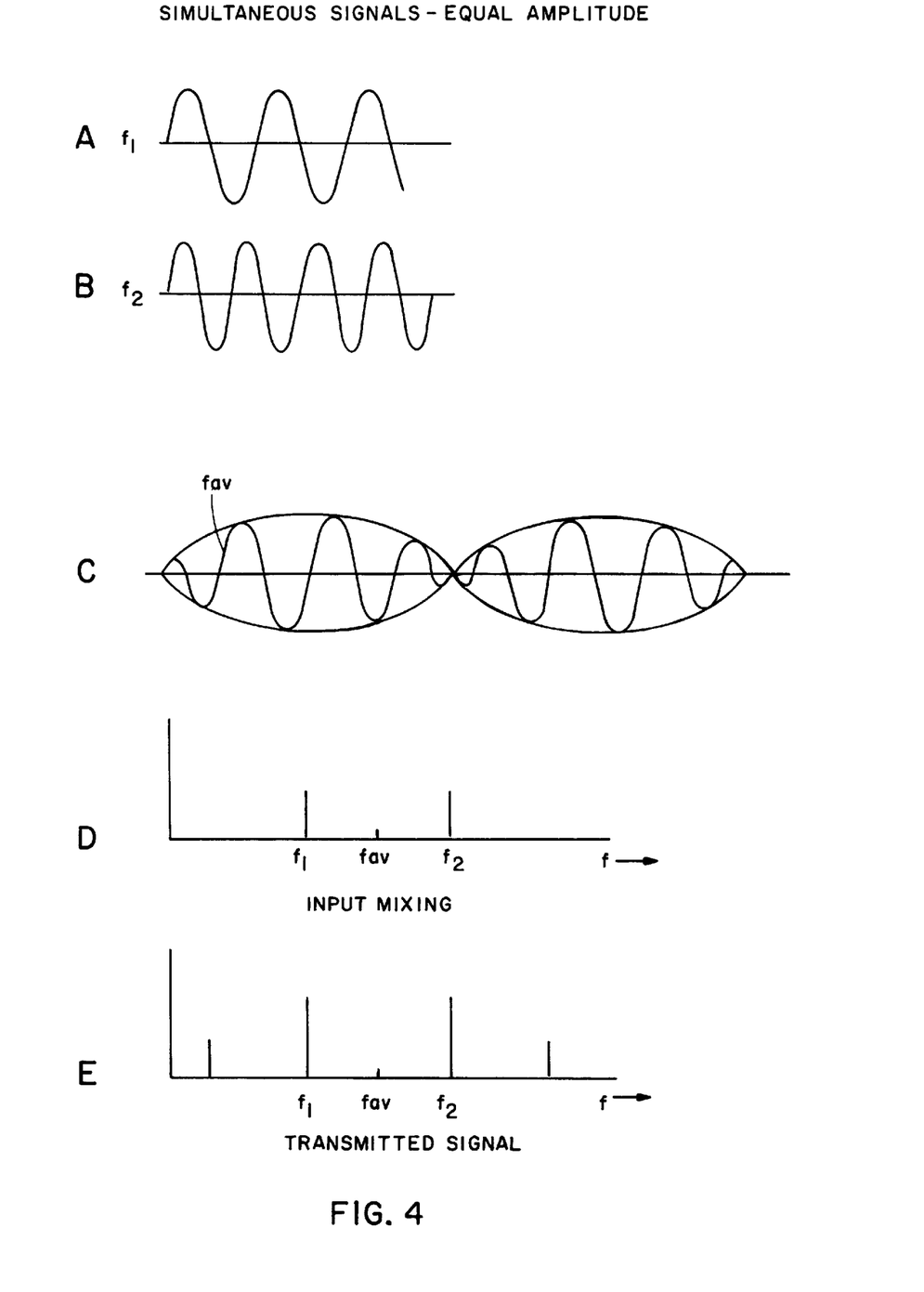
FIG. 4 is a diagramatic representation of the multi-threat capability of the primed oscillator illustrating the case in which simultaneous signals of different frequencies but of equal amplitudes arrive at the jammer.

It is one of the unique features of the subject jamming system that the subject system can handle simultaneous signals of different frequencies coming in from different "enemy" radars with the use of a single antenna and a single-port oscillator. The manner in which the system can handle signals of two different frequencies arriving simultaneously is illustrated in conjunction with FIG. 4. Referring to FIG. 4, assuming an incoming signal having a frequency $f_1$ as illustrated by waveform A and a simultaneously arriving signal having a frequency f as indicated by waveform B with both signals having the same amplitude, these signals are mixed as illustrated by graph D in the tank circuit of the oscillator as the priming signal such that, as illustrated by waveform C, a signal exists which is the equivalent of a double sideband-suppressed carrier signal with a carrier frequency of $f_{av}$, the average of the two signals. Because the oscillator in effect "clips" the envelope of waveform C, the resulting transmitted signal as illustrated by graph E has a component at $f_1$ and another component at $f_2$ with further sidebands existing at reduced power levels. Thus the transmitted signal has the required components to jam the two "enemy" radars producing the two simultaneously arriving signals.

Figure 5:
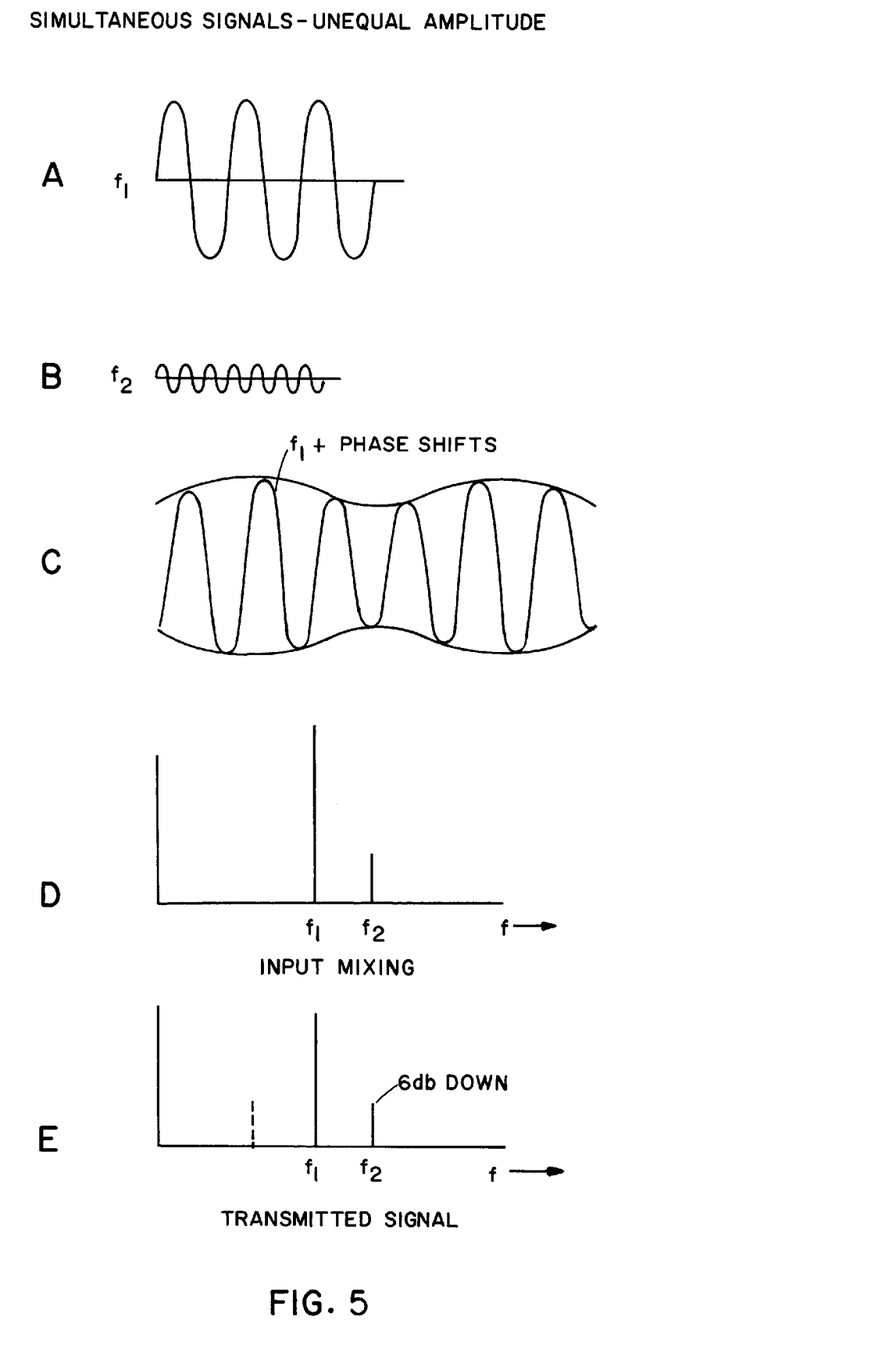
FIG. 5 is a diagramatic representation of the multi-threat case in which signals of different frequencies and unequal amplitudes are simultaneously present at the jammer.

The aforementioned case relates to the simultaneous arrival of signals of equal amplitude. As illustrated in FIG. 5 simultaneous signals of unequal amplitude result in the transmission of components of sufficient amplitude to jam the enemy radars producing each of the signals. In this figure considering waveform A the signal having a frequency $f_1$ and a rather large amplitude; and considering waveform B signal at $f_2$ having a relatively small amplitude, the input mixing signal is illustrated by waveform C with the envelope as shown and with the signal within the envelope having a frequency $f_1$ with some minor phase shifts. As illustrated by Graph D of this figure the input mixing components will have a strong component at $f_1$, and a somewhat weaker component at $f_2$. The transmitted signal as illustrated in Graph E includes a strong component at $f_1$ a moderately reduced component at $f_2$ and a symmetrical image component below $f_1$. While it will be appreciated that the amplitude of the $f_2$ component may be 6 db further down from that of the $f_1$ component than it was at the input, this component will still be sufficient to jam the "enemy" radar producing the $f_2$ signal. The extension to more than two signals is obvious.

Thus the subject system has a unique capability of handling multiple simultaneously arriving radar signals by producing a number of components each having a frequency equal to that of one of the various incoming signals and an amplitude sufficient to jam the corresponding "enemy" radar.

Figure 6:
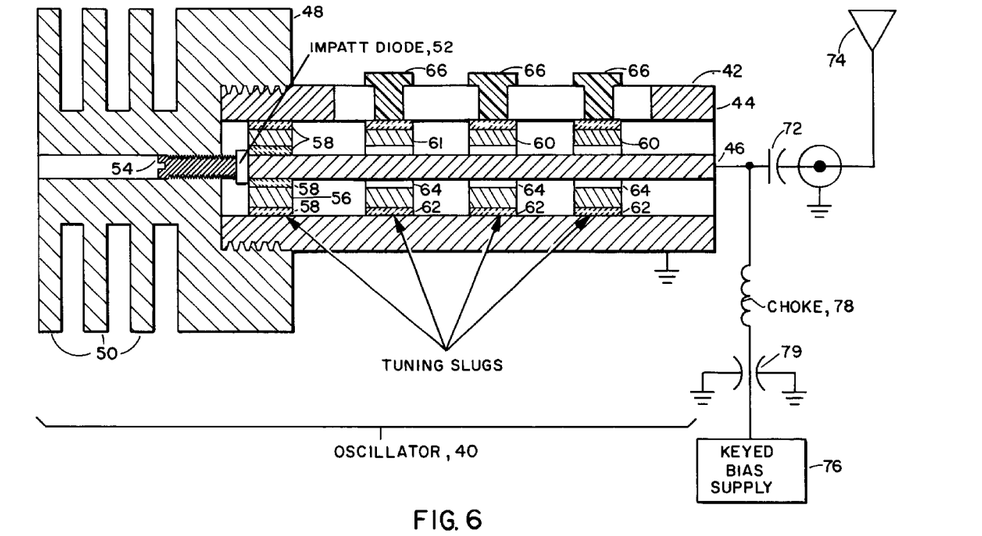
FIG. 6 is a sectional and schematic diagram of an IMPATT diode oscillator for use with the subject system.

As mentioned hereinbefore in one embodiment the subject jammer may include a primed oscillator having an IMPATT diode as its negative resistance element. This diode is an avalanche diode which breaks down very rapidly once its reverse bias breakdown voltage has been reached. In one configuration, as illustrated in FIG. 6, the IMPATT diode primed oscillator may be fabricated in coaxial form. In this embodiment an oscillator 40 includes a section of coaxial line 42 having an outer cylindrical conductor 44 and a centrally located inner conductor 46. This section of coaxial line is secured to a metallic end piece 48 which is provided with annular fins 50 for dissipating heat. An IMPATT diode 52 is sandwiched between the end of conductor 46 and a set screw 54 electrically and mechanically connected to end piece 48. Adjacent to IMPATT diode 52 and coaxially located with respect to conductor 46 is a fixed electronically conductive tuning slug 56 which is insulated from outer conductor 44 and inner conductor 46 by two annular rings of dielectric material generally indicated by reference characters 58. This tuning slug functions as a K inverter (a so-called "lumped element") to provide a parallel LC circuit across the terminals of the diode. Adjustable electrically conductive tuning slugs 60 are provided down the length of the coaxial section. These slugs are insulated from the outer conductor via annular rings 62 of dielectric material and from the inner conductor by air gaps 64. Each of these tuning slugs is adjustable along the longitudinal axis of the coaxial section and is clamped in place via dielectric set screws 66. Each of the tuning slugs provides a phase shift of 90° and acts as a K inverter. 20

Figure 7:
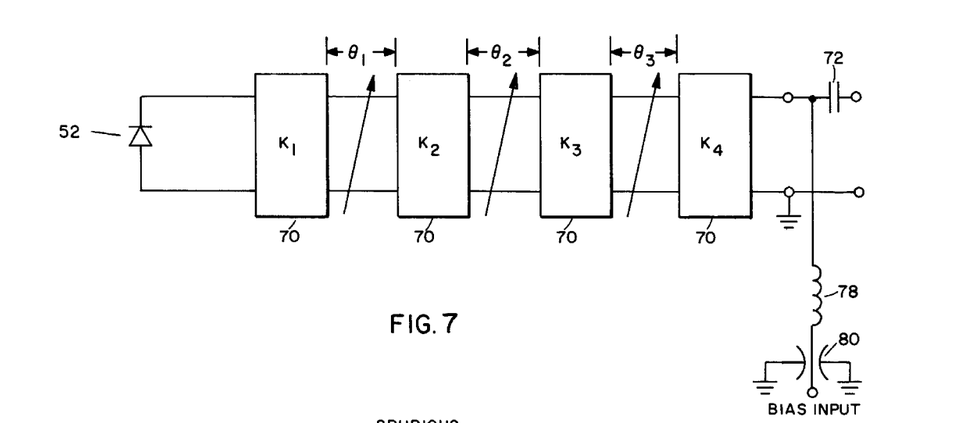
FIG. 7 is a schematic diagram of the IMPATT diode oscillator of FIG. 6.

Schematically illustrated, as can be seen from FIG. 7, the subject oscillator may be considered as including a number of K inverters 70 with the spacing between the inverters, θ1, θ2, and θ3 being adjustable. This in essence forms a circuit analogous to a shunt resonator, followed by a series resonator, followed by a shunt resonator, etc. The use of K inverters is this manner is well known as described in the MIT Radiation Laboratory Series Vol. 9, McGraw Hill, 1948, pps. 466–472. This phenomenon is also described in Microwave Filters, Impedance-matching Networks and Coupling Structures by George L. Matthaei, Leo Young and E. M. T. Jones published by McGraw Hill Inc. in 1964. It will be appreciated that by appropriate setting of θ1, θ2, and θ3 the subject oscillator may be given a resonant frequency which is in the center of the desired frequency band. In one operative embodiment θ1=87°, θ2=23.5° and θ3=212°, for a resonant frequency of 6.4 GHz, where θ=S/λ and S is the gap or separation between adjacent tuning slugs.

Referring back to FIG. 6, the output of the oscillator may be taken from the open end of the coaxial section such that inner conductor 46 may be coupled through a capacitor 72 to an input/output antenna 74 of conventional design. Biasing for the IMPATT diode is accomplished via keyed bias supply 76 which supplies a bias potential through an RF choke 78 to inner conductor 46. It will be appreciated that capacitor 72 removes all DC components from the output signal of the oscillator. A capacitor 79 is provided which operates in conjunction with the RF choke to minimize spurious signals as a result of the keying of the bias supply.

It is the function of the keyed bias supply to maintain the IMPATT diode just below its reverse bias breakdown voltage and then to cyclically provide the breakdown bias. This results in the rapid switching on and off of the oscillator so that the priming signal will have the desired effect even when the priming signal is some 60 to 80 db down from the signal at the output of the oscillator. In one embodiment the keying frequency is in excess of 14 MHz with a 50–75% duty cycle.

Figure 8:
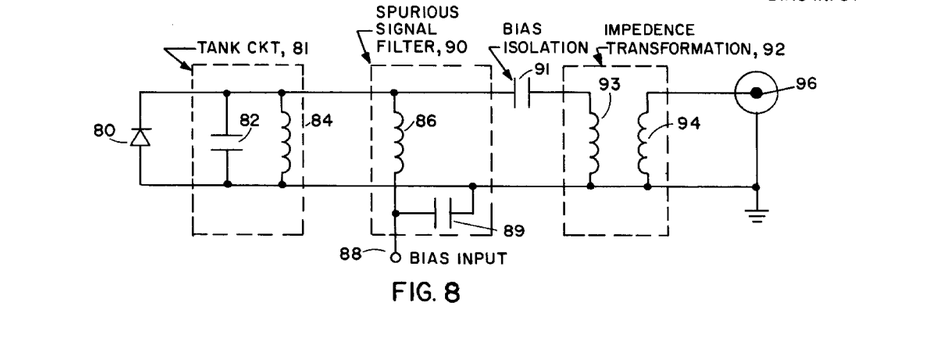
FIG. 8 is a low frequency analog of the IMPATT diode oscillator of FIG. 7.

While a strict low frequency schematic diagram of the oscillator is difficult to draw, an analogous low frequency oscillator schematic is illustrated in FIG. 8 to aid in the explanation of the oscillator. In this circuit an IMPATT diode 80 is connected across a parallel LC tank circuit 81 comprised of capacitor 82 and inductor 84. A further inductor 86 is coupled from a bias input terminal 88 to the cathode of the IMPATT diode. A capacitor 89 is coupled from this terminal to the anode of the diode and the anode is grounded as illustrated. This provides a spurious signal rejection filter 90. The cathode of the diode is connected through a D. C. blocking capacitor 91 to an impedance transforming circuit 92 comprising inductors 93 and 94 each of which have one side grounded. This is analogous to the $K_2$–$K_4$ inverters of FIG. 7. The free end of inductor 93 is connected to capacitor 91 and the free end of inductor 94 is connected to a coaxial output terminal 96 whose outer conductor is grounded. While strict analogy to the high frequency schematic is not possible, it will be appreciated that circuit elements 82 and 84 comprise a tank circuit tuned to a predetermined frequency. Inductor 86 corresponds to an RF choke coil with capacitor 89 functioning therewith to filter out spurious signals. Capacitor 91 functions to isolate the bias from the impedence transforming circuit which is comprised of inductors 93 and 94.

Thus it can be seen that the first K inverter, $K_1$, is analogous to a tank circuit which determines the resonant frequency of the oscillator. The remaining K inverters act as further resonating sections.

It will be appreciated that the oscillator thus described is one of a great many types of oscillators which may be utilized in the subject invention. In this oscillator bias is selectively gated to the oscillator which is maintained at a bias level just below that necessary to render the diode operative. Thus rapid chopping or keying of the oscillator is possible. As mentioned hereinbefore, other types of biasing circuits may be utilized such that power is continuously supplied to the oscillator, with the keying or chopping being accomplished by selectively shorting the tank circuit to prohibit the oscillator from oscillating. In either case, whether power to the oscillator is interrupted or whether the tank circuit is shorted, the effect is the same of rapidly turning on and off the oscillator.

Figure 9:
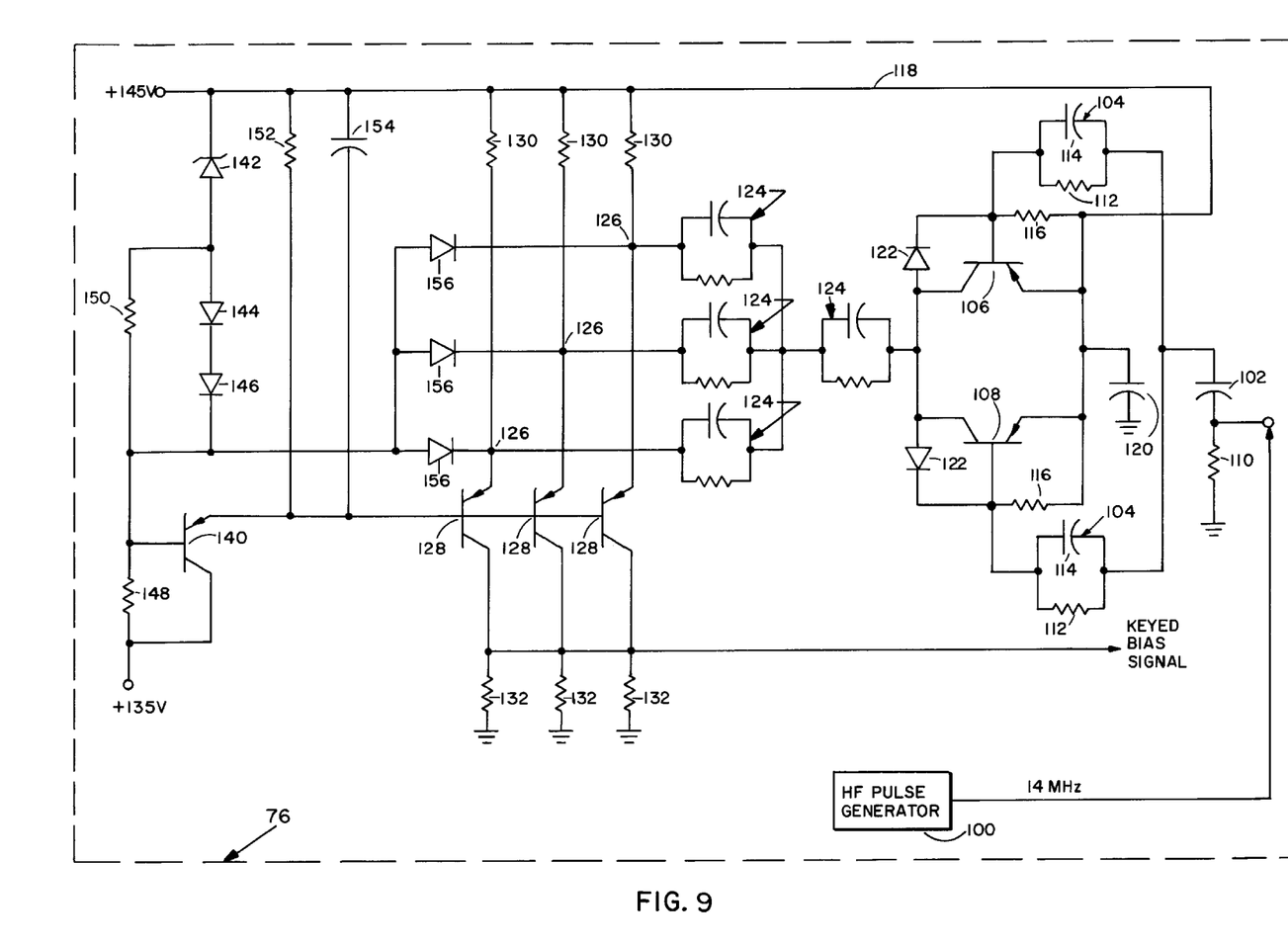
FIG. 9 is a schematic diagram of the keyed bias supply of FIG. 6.

In order to complete the description of the embodiment illustrated in FIG. 6 the keyed bias supply 76 is illustrated schematically in FIG. 9. It is the purpose of this bias supply to provide a high voltage, high current bias signal to the primed oscillator. In order to accomplish this, the bias circuit is fed via the output signal of a high frequency pulse generator 100 of conventional design which in one embodiment delivers a pulsed signal from 0 volts to −5 volts at its output.

Referring now to FIG. 9, high frequency pulse generator 100 produces a high frequency pulsed output signal on the order of 14MHz or higher in one embodiment. This signal is coupled via a coupling capacitor 102 and "speed up" networks 104 respectively to the bastes of parallel-connected switching transistors 106 and 108. A resistor 110 is provided as a load for the pulse generator. The "speed up" networks are each comprised of a resistor 112 and a capacitor 114 in parallel therewith. The purpose of the resistors is to equalize the trigger signals to the switching transistors while the capacitors are utilized to cancel the capacitance effect of the base-emitter junction of these transistors such that the rise time for the switching circuit is minimized. Resistors 116 from a high voltage bus 118 carrying in this case 145 volts provide that transistors 106 and 108 are rendered non-conductive when there is no negative going input signal from the pulse generator. It will be appreciated that the bases of transistors 106 and 108 are at the same potential as the emitter of these transistors until such time as the negative going 5 volt signal from the high frequency pulse generator is coupled to the base of these transistors. A bypass capacitor 120 is coupled between the emitters of these transistors and ground for removal of any high frequency signal components on the D. C. bus. Protective diodes 122 are connected as shown to protect the base-emitter junctions of these transistors against power supply failure.

Upon being rendered conductive, 145 volts from bus 118 is applied through the switching transistors to a second set of "speed up" circuits, each composed of parallel connected resistor-capacitative pairs 124. The resistors in these pairs determine the additional current applied to points 126 which are connected to the emitters of high powered transistors 128 as shown.

High power transistors 128 are normally biased into conduction via the potential applied to the bases thereof and via resistors 130 connected between the 145 volt bus and the emitters of the high power transistors. In the absence of a keying signal from the high frequency pulse generator, transistors 128 are in a condition of limited conduction such that the voltage across resistors 132 connected between the collectors of transistors 128 and ground is approximately 90–100 volts. This 90–100 volt potential is applied as a bias potential to the oscillator to maintain the IMPATT diode just slightly below its reverse bias breakdown voltage. Upon the application of the additional potential to points 126 additional current flows through the high power transistors thereby raising the potential at the collectors of these transistors to 135 volts which exceeds the reverse bias breakdown of the IMPATT diode in the oscillator. Since resistors 130 determine the quiescent current through transistors 128, it will be appreciated that the additional current available from the switching transistors through the resistive elements of the resistor-capacitor pairs 124 provides additional current through the high power transistors such that the potential at the junction between the collectors of the high powered transistors and their associated collector resistors increases. The voltage swing therefore, rather than being a full 145 volts, is closer to 35 volts which results in considerable switching speed for the keyed bias supply. As such the subject circuit will work at close to 40 MHz thereby providing improved frequency tracking for the primed oscillator by the very rapid keying.

High power switching transistors 128 which may be obtained commercially from Motorola Inc. as model no. 2N5160 are normally biased into conduction at a fixed level by an emitter follower stage which includes a transistor 140 the base of which is controlled by a zener diode 142 and compensating diodes 144 and 146 connected in series such that the base of this transistor is maintained at a fixed potential below that of the 145 volt bus. The collector of this transistor is connected to a 135 volt bus with a resistor 148 being connected between this bus and the base of transistor 140. A current shunting transistor 150 is provided across compensating diodes 144 and 146 to shunt current away from these diodes so that their ratings may be minimized.

In operation, the subject biasing circuit maintains the base of the high power transistors at 5.6 volts below the 145 volt bus, which voltage is very accurately controlled by virtue of the zener diode drop and the drop across the compensating diodes which compensate for the variable voltage drop across transistor 140 with temperature. This base bias for the high power transistors in conjunction resistors 130 sets the quiescent current through the high power transistors. A resistor 152 is provided between the high voltage bus and the emitter of transistor 140 to keep the emitter follower stage at a reasonable current level when there is no keying. A bypass capacitor 154 shunts all AC signals away from the base of the high power transistors to the high voltage bus and thence to ground via capacitor 120. Diodes 156 are provided between the base of transistor 140 and the emitters of high power transistors to prevent breakdown of the base-emitter junctions of the high power transistors and the emitter follower transistor due to power supply failure.

It will thus be appreciated that the subject bias keying circuit provides an exceptionally rapid rise time high current bias pulse to the primed oscillator, with the speed of the bias switching being accomplished not only by the small voltage swing utilized in breaking down the IMPATT diode but also by the so-called "speed up" circuits which function basically to nullify the stray capacitance effect of the transistors involved in the circuits. The high current capability is provided by three parallel-connected switching transistors which are utilized in place of a single even higher power transistor which of course could be utilized. Moreover it is possible to eliminate current shunt resistor 150 with appropriately rated diodes.

Although a specific embodiment to the invention has been described in considerable detail for illustrative purposes, many modifications will occur to those skilled in the art. It is therefore desired that the protection afforded by Letters Patent be limited only by the true scope of the appended claims.

What is claimed is:

1. An expendable jamming system adapted to be ejected from a target as a decoy to provide an enemy radar with false bearing and relative velocity information comprising an oscillator including a circuit which determines the natural oscillating frequency of the oscillator, an antenna coupled to said circuit, and means for rapidly turning said oscillator on and off.

2. The jamming system of claim 1 wherein said oscillator includes a diode and wherein said means for turning said oscillator on and off includes a keyed bias supply, said supply including means for supplying a bias voltage to said diode just under that necessary to render it operative and for periodically increasing said bias voltage to a level sufficient to render said diode operative thereby to turn on said oscillator.

3. The jamming system of claim 1 wherein said means for turning said oscillator on and off includes a power supply continuously applied to said oscillator and means for periodically shorting said frequency determining circuit thereby to periodically quench said oscillator.

4. The jamming system of claim 1 wherein said means for turning said oscillator on and off includes a power supply and means for selectively connecting said power supply to said oscillator.

5. The jamming system of claim 4 wherein said power supply is self-contained and includes battery power generating means.

6. The jamming system of claim 1 wherein the signal from said enemy radar is a CW signal and wherein said means for turning said oscillator on and off includes means for turning said oscillator on and off sufficiently rapidly such that the pulsed output signal from said oscillator approximates said CW signal and is detected as a CW signal at said enemy radar.

7. The jamming system of claim 6 wherein the frequency of said last mentioned means exceeds 1 KHz.

8. A method of jamming an enemy radar which transmits electromagnetic energy towards a target and receives electromagnetic energy returned from said target comprising providing an expendable unit which generates a pulse train of electromagnetic energy in which the phase of the signals within each pulse initially equals that of the received electromagnetic energy, the pulse repetition frequency of said pulse train being sufficiently rapid both to prevent significant variation in the phase of the signals within each pulse with respect to that of the received electromagnetic energy and to prevent detection of the pulsed nature of said signal at said receiver, and ejecting said unit from said target.

9. A method of jamming an enemy radar which transmits a signal towards a predetermined target comprising the steps of providing an expendable device at said target, said device including an oscillator having a circuit which determines the natural oscillation frequency of said oscillator, and a negative resistance element coupled thereto, an antenna coupled to said circuit and means for rapidly turning said oscillator on and off, and ejecting said expendable device from said target, whereby the signal from said enemy radar primes said oscillator and causes it to produce a signal from said antenna having a frequency substantially equal to that of the signal from said enemy radar.

10. The method of claim 9 wherein the turning on and off of said oscillator is sufficiently rapid to provide that each pulse of the rapidly pulsed output signal from said oscillator contains signals simulating in frequency a periodic signal received at said antenna having an amplitude greater than that of the noise at said antenna.

\* \* \* \* \*